J. C. PAINE.
Gridiron.
No. 62,218.
Patented Feb. 19, 1867.
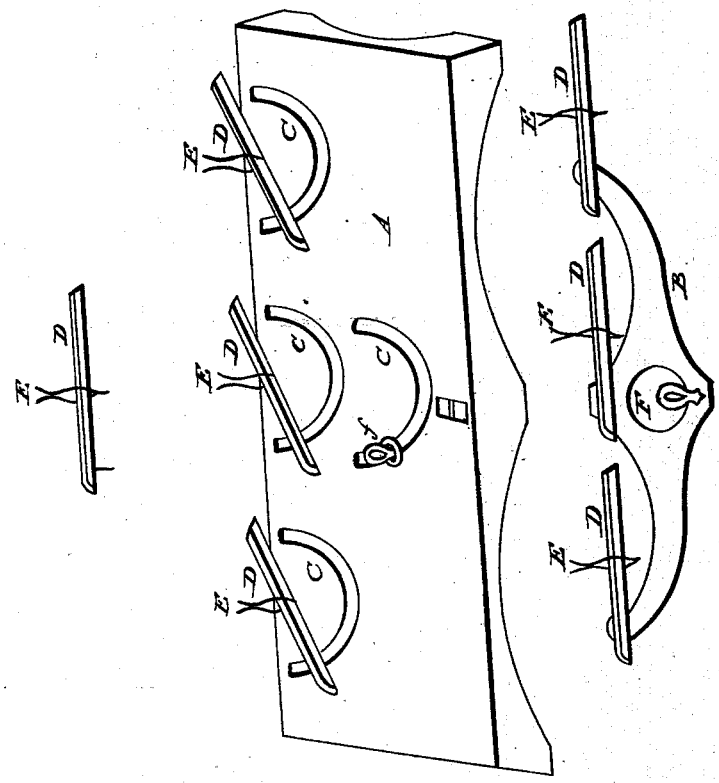
Witnesses:
Frank M Robinson
G. B. Rand

United States Patent Office.

JOSEPH C. PAINE, OF DUBUQUE, IOWA.

Letters Patent No. 62,218, dated February 19, 1867.

REVOLVING BREAD TOASTER.

The Schedule referred to in these Letters Patent and making part of the same.

TO ALL WHOM IT MAY CONCERN:

Be it known that I, JOSEPH C. PAINE, of Dubuque, in the county of Dubuque, and State of Iowa, have invented a new and useful improvement in a Revolving Bread Toaster, which I verily believe has not been known or used prior to the invention thereof by your petitioner; and I do hereby declare that the following specification is a full, clear, and exact description of the same, reference being had to the accompanying drawings, with letters of reference marked thereon—

A being the frame or main plate, with four (4) semicircle slots or guides, C C C C, for the purpose of connecting the flutes or rests D D D, by means of pins or rivets, with the slide-bar B, below the main plate, and allowing them to revolve half way round simply by moving the thumb-piece F back and forwards, as shown in drawings. D D D are the flutes or rests upon which the bread is supported and kept upright by the holders E E E, these holders being securely fastened into said flutes or rests.

By the use of this invention bread can be toasted much easier and better, as it is placed, a slice in each holder, and set before the fire, (the fire-doors being thrown open,) and when the one side is sufficiently toasted the whole are turned at once by moving the thumb-piece to the opposite side.

What I claim as my invention, and desire to secure by Letters Patent, is—

The plate A, with slots or guides C C C C, thumb-piece F, slide-bar B, with flutes or rests D D D, and holders E E E, or their equivalents, substantially as and for the purposes herein specified.

JOSEPH C. PAINE.

Witnesses:
AUSTIN ADAMS,
G. B. RAND.